United States Patent [19]

Kelly et al.

[11] Patent Number: 4,491,089

[45] Date of Patent: Jan. 1, 1985

[54] DEVICE FOR SUPPORTING ANIMALS

[76] Inventors: Michael F. Kelly; William R. Kelly, both of "Lugano", Rugby via Crookwell, New South Wales, Australia, 2625

[21] Appl. No.: 437,818

[22] Filed: Oct. 29, 1982

[30] Foreign Application Priority Data

Nov. 18, 1981 [AU] Australia ............................... PF1612
Jun. 30, 1982 [AU] Australia ............................... PF4656

[51] Int. Cl.$^3$ ............................................... A61D 3/00
[52] U.S. Cl. ........................................ 119/103; 5/449; 5/455
[58] Field of Search .......................... 119/29, 103, 102; 5/449, 455; 297/DIG. 3; 441/40, 41, 66, 90; 114/54; 410/119

[56] References Cited

U.S. PATENT DOCUMENTS

| | | | |
|---|---|---|---|
| 726,164 | 4/1903 | Hogan et al. | ............................. 5/449 |
| 1,830,570 | 11/1931 | Smith et al. | ........................... 5/449 X |
| 2,853,720 | 9/1958 | Friedlander | ........................ 441/40 X |
| 4,054,960 | 10/1977 | Pettit et al. | ......................... 5/455 X |
| 4,070,989 | 1/1978 | Ganzel | ............................. 119/102 X |
| 4,185,591 | 1/1980 | Patelis | ............................. 119/103 X |

FOREIGN PATENT DOCUMENTS 50731  5/1982  European Pat. Off. ................ 5/449

Primary Examiner—Robert P. Swiatek
Attorney, Agent, or Firm—Balogh, Osann, Kramer, Dvorak, Genova & Traub

[57] ABSTRACT

This invention concerns a support device for raising an animal from a collapsed position to an upright position. The support structure is a fluid inflatable bag which may be inflated by air or water. The bag has four apertures to receive the legs of collapsed animals thereby enabling the animal to be supported with its legs clear of the ground. In the preferred form the bag comprises three compartments which are separately inflatable. The compartments may be further provided with a plurality of additional compartments underneath or to each side. The bag may be made from a strong canvas outer skin with an interior lining of a suitable plastics material. There is no frame or other form of support member for the bag, it being entirely self-supporting and self-raising by virtue of the fluid pressure of air or water.

5 Claims, 2 Drawing Figures

DEVICE FOR SUPPORTING ANIMALS

FIELD OF THE INVENTION

This invention relates to a support device for animals and to a method of raising animals from a collapsed position to an upright position.

Whilst this invention is not limited to any particular species of animals, it is particularly concerned with cattle and for the sake of brevity will be described with particular reference to cattle. However there is an application to zoo and wild animals. In the latter case the support device may have special joiners to enable very large animals to be lifted.

Each year in Australia and overseas large numbers of livestock die due to a condition known as "Downer Cow Syndrome". Downer Cow Syndrome is not unique to cattle and is a secondary ailment brought on when an animal goes down due to paralysis brought on e.g. by a difficult birth or milk fever (calcium deficiency) etc. In the case of Downer Cow Syndrome the animal is unable to get back on its feet due to extreme pressure on its hindquarters and forelegs resulting in ischaemic necrosis.

DESCRIPTION OF THE PRIOR ART

The most common method after an animal goes down is to turn her from side to side, several times daily to minimize the degree of Ischaemic Necrosis and Para-Analgesia which results from prolonged recumbency. Veterinary surgeons recommend that ideally the animal should be slung in a standing position.

In the event of a cow going down the problems are many.

(1) Grown cattle weigh between 275-1400 Kg and thus are difficult to handle.

(2) Cattle when slung usually chafe badly due to so much weight being distributed over a small area.

(3) Cattle are stifled under the udder due to lack of bone support.

(4) Cattle can displace their weight either back or forward so as to fall out of the sling.

(5) Finding a suitable spot to place a sling or hip clamps can be a problem, e.g. lack of easy access due to a creek etc.

(6) Coliform mastitis, decubitus ulceration, especially over the prominence of the hock and elbow joint and traumatic injuries around the tuber coxae are a common result from the use of hip slings.

(7) In the event that the animal is left lying on the ground they are generally affected by the cold damp ground, become fly-blown due to lying in their own urine and manure and usually work their way down hill and into a creek or other undesirable place.

Foals, weanlings, yearlings and grown horses are extremely prene to leg injuries. These usually come in the form of either sprained tendons and ligaments, torn muscles, broken bones etc. Ideally the animal should be slung and immobilized to take the weight off the injury.

Experience has shown that horse slings are generally unsatisfactory, having the same problems that slings used to immobilize cattle have.

Immersion baths are also used but these are expensive to purchase and operate and in the event of open wounds, it is difficult to apply dressings.

A type of water support is shown in U.S. Pat. No. 4070 989 issued Jan. 31 1978. This Patent describes a convalescent recovery stall for large animals comprising a rectangular frame of length and width greater than the corresponding dimensions of the animal, with means for inserting wall sections into said frame, so as to provide a rectangular box surrounding said animal, to a selected height. There is at least one rectangular, closed, flexible walled water tank which will fit snuggly within the walls of the box. There is at least one reentrant tube of flexible material sealed into the top surface of the tank. Altogether there will be four such tubes one for each of the four legs. The contour of the tube is such as to fit a leg of the animal. The vertical height of the tank is greater than the length of the legs of the animal so that when the tank is filled with water under pressure, the water pressing on the surfaces of the legs, chest and abdomen of the animal, will support its weight. There can be one such tank with four reentrant tubes, one for each of the four legs, or two, or four tanks depending on the size of the animal.

The device is expensive and complicated. Further, it is not easily transported and in practice requires location near a source of water.

SUMMARY OF THE INVENTION

Important objects of this invention are to overcome the defects of the prior art and to provide a device, capable of operation by one person, which supports cattle without placing undue pressure on any particular portion.

Thus, in one aspect this invention comprises a bag preferably having separate compartments for supporting the animal, the said bag being adapted to be filled with fluid e.g. air, exhaust gas or liquid, the said bag being provided with recesses for the animals legs, means for the ingress and exit of the fluid to each separate compartment and a separate valve therefor.

BRIEF DESCRIPTION OF THE SEVERAL VIEWS OF THE DRAWINGS

The invention will become clearer when regard is given to the accompanying drawings of diagrammatical illustrations of possible devices of the invention.

DETAILED DESCRIPTION

Figure 1:
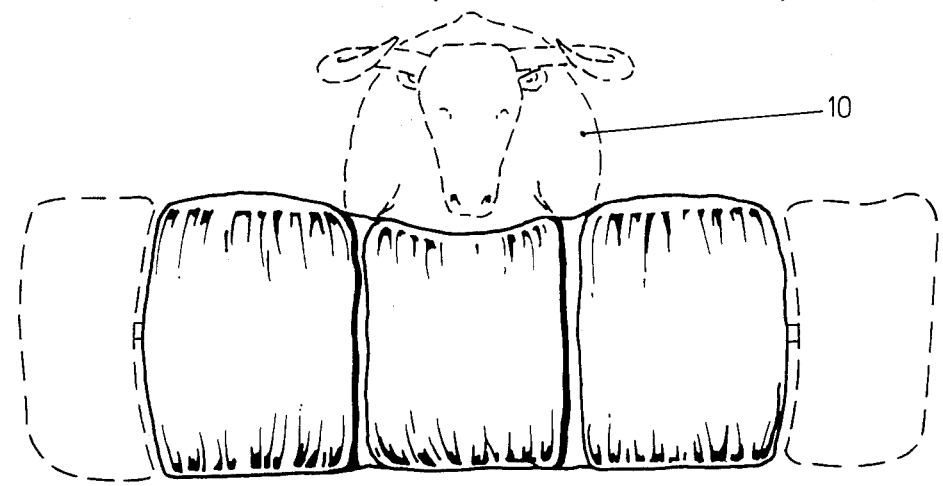
FIG. 1 shows an elevational view of an inflated structure.
Figure 2:
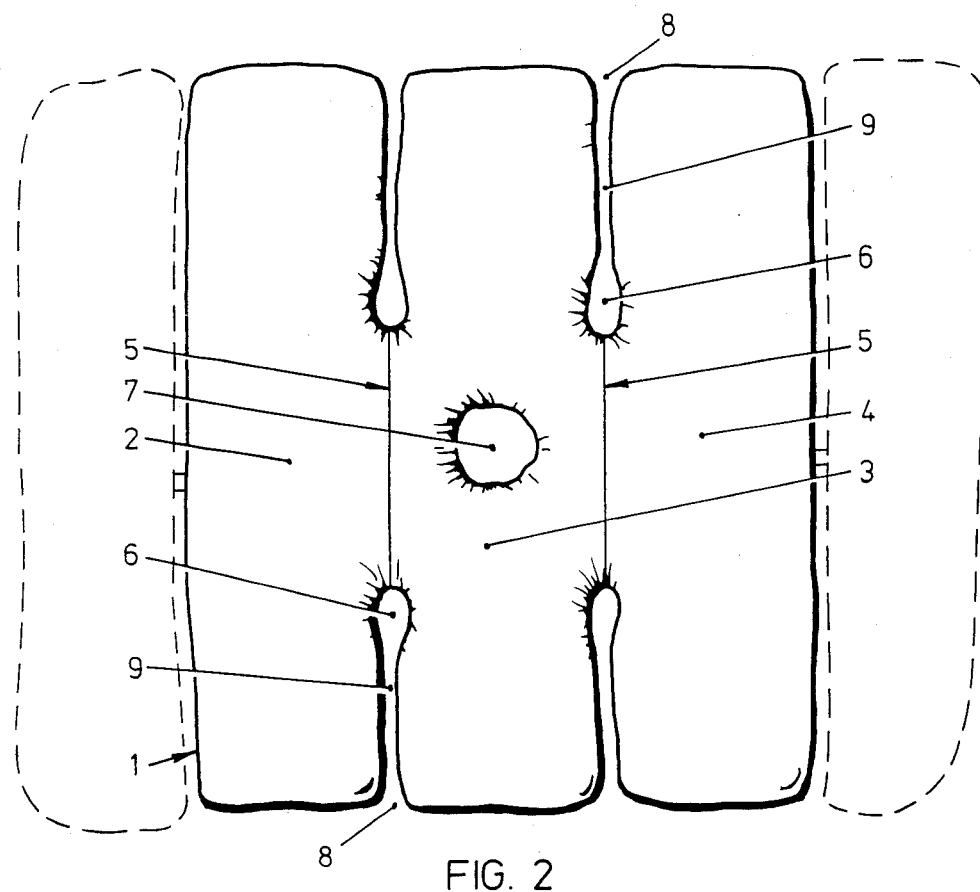
FIG. 2 is a plan view of the bag of the invention.

The inflated structure is preferably composed of strong plastics material, treated canvas or the like. As shown, the structure may be considered to be composed of three compartments 2, 3 and 4 which may be separately inflatable. The compartments may be further provided with a plurality of additional compartments underneath or to each side, as shown in phantom in FIGS. 1 and 2.

For convenience, the structure 1 is of general parallelipiped shape, with the notional compartments separated by channels 8-9 ending in recesses 6 provided for the animal's legs. Numeral 5 designates the connecting panels when the structure 1 is indeed a multi-compartment structure. As shown when the structure 1 is inflated the animal 10 is centrally positioned with its chest, hip and rear supported. Desirably an aperture or hole 7 is provided for urine disposal.

If the structure is of three compartment type then compartments 2, 3 and 4 may be separately inflated or inflated to a different degree to provide for stability, particularly when the animal and bag are located on a slope.

In operation the empty bag may be placed under the downer (which is usually on its side) and if necessary slightly inflated, the legs guided into the recesses and inflation commenced or continued. As inflation proceeds the animal may be assisted into a normally upright position. The animal may be retained in such a position whilst remedial treatment is given and allowed to convalesce until its strength has been recovered.

When the structure is of the three compartment type then normally only compartments 2 and 3 are inflated initially whereby the bag tends to wrap around the animal preventing movement of any magnitude. Subsequently compartment 1 is inflated to allow the animal to reach the desired height. Usually the desired height is such that the animal's hooves are just in contact with the ground so that there is no weight on the legs.

If desired, to provide for larger animals, the basic structure as outlined hereinbefore could be of a size to suit a heifer, for example, and a further compartment located above central compartment 2 whereby the bag could be used for larger stock such as bulls or cattle such as Charolais.

The bag or structure of the invention may be used for a great variety of animals—cattle, horses, sheep, zoo animals etc. The inflating agent may be air, gas e.g. exhaust fumes from an internal combustion engine or water. Naturally valves are placed at suitable locations for inflation purposes. The materials which may be used for the structure are diverse and include multi-ply types such as an internal bladder of a suitable plastics with a strong canvas outside cover.

In the preferred form apertures or slots with external communication are provided for the legs rather than holes as it is easier to position legs into slots during inflation and furthermore slots allow access to the legs for treatment or dressing of wounds or cuts.

A mat which allows ingress and egress of air may be provided on the top of the structure. (This will minimise 'bed-sore' type infections by allowing breathing). The upper surface of the structure may be electrically heated or have an electric blanket placed thereon to keep the animal warm and thereby reduce pneumococcal infection.

If desired a fly or cover may be hung over the bag to reduce exposure. The bag may be supported on a base e.g. a strong wooden pallet type thereby enabling the animal and its supports to be lifted onto transport means for conveyance or freighting to a desired location where e.g. specialist assistance is available for treatment.

The structure may be provided with additional compartments positioned underneath the existing compartments whereby adjustment of the height or length of the bag is obtainable. Alternatively the structure may be designed on a build-a-block system with special connectors to lift unusual shaped animals e.g. elephants and hippopotamuses - this may require two or more bags underneath and four or five on either side.

It is reiterated that the invention is to be given a broad connotation and it is not intended that it be limited to the embodiment specifically described.

We claim:

1. A support structure of substantially parallipiped shape for raising an animal from a collapsed position to an upright position and adapted to support said animal in said upright position for an extended period of time consisting of a fluid inflatable bag means, two channels each extending longitudinally into the structure from opposite ends thereof for part of the length of the bag whereby the animal's legs may be received and the animal supported with the lower extremity of its legs clean off the ground or in a position merely resting thereon, said structure being free of any frame or other support members.

2. A structure as claimed in claim 1 wherein the structure is further provided with a central hole.

3. A support structure as claimed in claim 1 wherein the longitudinal channels are substantially symmetrically and centrally positioned.

4. A support structure as claimed in claim 1 wherein the structure is composed of a strong canvas material provided with an internal bladder of a suitable plastics material.

5. A support structure as claimed in claim 1 wherein the fluid inflatable bag means comprises three compartments each said compartment being separately inflatable further provided with a plurality of additional compartments underneath or to each side.

* * * * *